United States Patent
Goedken et al.

(10) Patent No.: US 9,622,190 B2
(45) Date of Patent: Apr. 11, 2017

(54) SPECTRUM EMISSION LEVEL VARIATION IN SCHEDULABLE WIRELESS COMMUNICATION TERMINAL

(71) Applicant: Google Technology Holdings LLC, Mountain View, CA (US)

(72) Inventors: Ryan J. Goedken, Santa Clara, CA (US); Armin W. Klomsdorf, Chicago, IL (US); Thomas D. Nagode, Vernon Hills, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 326 days.

(21) Appl. No.: 13/693,469

(22) Filed: Dec. 4, 2012

(65) Prior Publication Data

US 2013/0165132 A1  Jun. 27, 2013

Related U.S. Application Data (63) Continuation-in-part of application No. 11/459,863, filed on Jul. 25, 2006, now abandoned.

(51) Int. Cl.
  *H04W 72/00* (2009.01)
  *H04W 52/24* (2009.01)
  (Continued)

(52) U.S. Cl.
  CPC ........ *H04W 52/243* (2013.01); *H04W 52/242* (2013.01); *H04W 52/52* (2013.01); *H04W 72/042* (2013.01); *H04W 72/082* (2013.01)

(58) Field of Classification Search
  CPC ..... H04W 16/00; H04W 16/02; H04W 16/04; H04W 16/06; H04W 16/10; H04W 16/12;
  (Continued)

(56) References Cited

U.S. PATENT DOCUMENTS

| 4,939,786 A | 7/1990 | McCallum et al. |
| 5,155,448 A | 10/1992 | Powell |

(Continued)

FOREIGN PATENT DOCUMENTS

| CN | 1778053 A | 5/2006 |
| EP | 1271769 A2 | 6/2002 |

(Continued)

OTHER PUBLICATIONS

3GPP TSG RAN WG1 #43bis, R1-06xxxx "UE Power Management for EUTRA" Motorola, Helsinki, Finland, Jan. 23-25, 2005, 5 pages.
(Continued)

*Primary Examiner* — Shantell L Heiber
(74) *Attorney, Agent, or Firm* — Faegre Baker Daniels LLP (57) ABSTRACT

A wireless communication entity schedulable in a wireless communication network, including a controller (603) communicably coupled to a power amplifier (608), wherein the controller varies a spectrum emissions level of the wireless communication entity based on the radio resource assignment information receiver by the radio receiver, such as whether NS signaling is active. Examples of NS signaling include sending an NS_07 signaling flag for band 13 signaling or one of a NS_12-15 signaling flag for band 26.

20 Claims, 7 Drawing Sheets

(51) Int. Cl.
*H04W 52/52* (2009.01)
*H04W 72/08* (2009.01)
*H04W 72/04* (2009.01)

(58) Field of Classification Search
CPC ..... H04W 28/02; H04W 28/16; H04W 28/26; H04W 72/02
See application file for complete search history.

(56) References Cited

U.S. PATENT DOCUMENTS

| | | |
|---|---|---|
| 5,754,946 A | 5/1998 | Cameron et al. |
| 6,041,081 A | 3/2000 | O et al. |
| 6,160,449 A | 12/2000 | Klomsdorf et al. |
| 6,166,598 A | 12/2000 | Schlueter |
| 6,175,550 B1 | 1/2001 | van Nee |
| 6,281,748 B1 | 8/2001 | Klomsdorf et al. |
| 6,311,046 B1 | 10/2001 | Dent |
| 6,366,761 B1* | 4/2002 | Montpetit ............ 455/12.1 |
| 6,417,736 B1 | 7/2002 | Lewyn |
| 6,421,541 B1 | 7/2002 | Karlsson et al. |
| 6,516,196 B1 | 2/2003 | Chen et al. |
| 6,577,879 B1* | 6/2003 | Hagerman et al. ........ 455/562.1 |
| 6,611,676 B2 | 8/2003 | Ue et al. |
| 6,631,268 B1 | 10/2003 | Lilja |
| 6,751,444 B1 | 6/2004 | Meiyappan |
| 6,836,666 B2 | 12/2004 | Gopalakrishnan et al. |
| 6,865,169 B1* | 3/2005 | Quayle et al. ............ 370/335 |
| 6,925,068 B1 | 8/2005 | Stanwood et al. |
| 6,934,268 B1 | 8/2005 | Hedlund et al. |
| 6,944,460 B2 | 9/2005 | Haartsen |
| 6,983,026 B2 | 1/2006 | Pinckley et al. |
| 6,985,704 B2 | 1/2006 | Yang et al. |
| 7,069,577 B2 | 6/2006 | Geile et al. |
| 7,151,795 B1 | 12/2006 | Goldburg |
| 7,519,013 B2 | 4/2009 | Destino et al. |
| 7,593,699 B2 | 9/2009 | Duperray |
| 7,664,465 B2 | 2/2010 | Shen et al. |
| 7,877,108 B2 | 1/2011 | Wengerter et al. |
| 8,310,921 B2 | 11/2012 | Cho et al. |
| 2001/0027113 A1 | 10/2001 | Hayashihara |
| 2002/0094795 A1 | 7/2002 | Mitzlaff |
| 2002/0172160 A1 | 11/2002 | Moulsley |
| 2003/0100328 A1 | 5/2003 | Klein et al. |
| 2004/0082335 A1 | 4/2004 | Hirayama et al. |
| 2004/0109424 A1 | 6/2004 | Chheda |
| 2004/0127173 A1 | 7/2004 | Leizerovich |
| 2004/0131072 A1* | 7/2004 | Khan ............... H04L 12/6402 370/419 |
| 2004/0147276 A1 | 7/2004 | Gholmieh et al. |
| 2004/0162097 A1 | 8/2004 | Vijayan et al. |
| 2004/0185868 A1 | 9/2004 | Jain et al. |
| 2004/0192323 A1 | 9/2004 | Valenzuela |
| 2004/0212428 A1 | 10/2004 | Ode et al. |
| 2004/0224656 A1* | 11/2004 | Mimura et al. ............ 455/275 |
| 2005/0030953 A1 | 2/2005 | Vasudevan et al. |
| 2005/0078743 A1 | 4/2005 | Shohara |
| 2005/0111391 A1 | 5/2005 | Oki et al. |
| 2005/0201180 A1 | 9/2005 | Naguib et al. |
| 2005/0245264 A1 | 11/2005 | Laroia et al. |
| 2006/0035660 A1* | 2/2006 | Anderson ............ 455/522 |
| 2006/0050798 A1* | 3/2006 | Odigie et al. ............ 375/259 |
| 2006/0068830 A1* | 3/2006 | Klomsdorf et al. .......... 455/522 |
| 2006/0128324 A1 | 6/2006 | Tan et al. |
| 2006/0135075 A1 | 6/2006 | Tee et al. |
| 2007/0037594 A1 | 2/2007 | Palenius et al. |
| 2007/0097853 A1 | 5/2007 | Khandekar et al. |
| 2007/0173260 A1 | 7/2007 | Love et al. |
| 2007/0173276 A1 | 7/2007 | Love et al. |
| 2007/0220217 A1 | 9/2007 | Shankara |
| 2008/0025254 A1 | 1/2008 | Love et al. |
| 2008/0080476 A1 | 4/2008 | Cho et al. |
| 2008/0318527 A1 | 12/2008 | Higuchi et al. |
| 2009/0042532 A1 | 2/2009 | Bienas et al. |
| 2009/0046693 A1 | 2/2009 | Nory et al. |
| 2009/0143070 A1 | 6/2009 | Shu et al. |
| 2009/0175235 A1 | 7/2009 | Spinar et al. |
| 2009/0196262 A1 | 8/2009 | Chin et al. |
| 2009/0247172 A1 | 10/2009 | Palanki et al. |
| 2009/0262692 A1 | 10/2009 | Olszewski |
| 2010/0015967 A1 | 1/2010 | Perets et al. |
| 2010/0054161 A1 | 3/2010 | Montojo et al. |
| 2010/0120424 A1 | 5/2010 | Johansson et al. |
| 2010/0172428 A1 | 7/2010 | Pani et al. |
| 2010/0215011 A1 | 8/2010 | Pan et al. |
| 2010/0227569 A1 | 9/2010 | Bala et al. |
| 2010/0234040 A1 | 9/2010 | Palanki et al. |
| 2010/0254329 A1 | 10/2010 | Pan et al. |
| 2010/0302983 A1 | 12/2010 | McBeath et al. |
| 2010/0303036 A1 | 12/2010 | McBeath et al. |
| 2010/0304689 A1 | 12/2010 | McBeath et al. |
| 2010/0316146 A1 | 12/2010 | McBeath et al. |
| 2010/0317360 A1 | 12/2010 | McBeath et al. |
| 2010/0322158 A1 | 12/2010 | Lee et al. |
| 2010/0323744 A1 | 12/2010 | Kim et al. |
| 2010/0323745 A1 | 12/2010 | Chen et al. |
| 2010/0331030 A1 | 12/2010 | Nory et al. |
| 2011/0007778 A1 | 1/2011 | Kishiyama et al. |
| 2011/0019596 A1 | 1/2011 | Li et al. |
| 2011/0019634 A1 | 1/2011 | Fujii et al. |
| 2011/0026473 A1 | 2/2011 | Luo et al. |
| 2011/0044218 A1 | 2/2011 | Kaur et al. |
| 2011/0076962 A1 | 3/2011 | Chen et al. |
| 2011/0136497 A1 | 6/2011 | Youtz et al. |
| 2011/0194523 A1 | 8/2011 | Chung et al. |
| 2011/0207490 A1 | 8/2011 | Lee et al. |
| 2011/0230144 A1 | 9/2011 | Siomina et al. |
| 2011/0243090 A1 | 10/2011 | Grovlen et al. |
| 2011/0280141 A1 | 11/2011 | Chin et al. |
| 2012/0021695 A1 | 1/2012 | Murji |
| 2012/0113806 A1 | 5/2012 | Gong et al. |
| 2012/0113924 A1 | 5/2012 | Kashiwagi et al. |
| 2012/0163250 A1 | 6/2012 | Chin et al. |
| 2012/0172080 A1 | 7/2012 | Love et al. |
| 2012/0172081 A1 | 7/2012 | Love et al. |
| 2012/0263047 A1 | 10/2012 | Love et al. |
| 2012/0263117 A1 | 10/2012 | Love et al. |
| 2012/0263118 A1 | 10/2012 | Love et al. |
| 2013/0022005 A1 | 1/2013 | Yano et al. |
| 2013/0142268 A1 | 6/2013 | Gao et al. |
| 2013/0165132 A1 | 6/2013 | Goedken et al. |

FOREIGN PATENT DOCUMENTS

| | | |
|---|---|---|
| EP | 1530388 A1 | 5/2005 |
| WO | 2001018987 A1 | 3/2001 |
| WO | 2002100025 A1 | 12/2002 |
| WO | 03088520 A1 | 10/2003 |
| WO | 2004045228 A1 | 5/2004 |
| WO | 2004077664 A1 | 9/2004 |
| WO | 2005018114 A1 | 2/2005 |
| WO | 2006007318 A1 | 1/2006 |
| WO | 2007/087483 A1 | 8/2007 |
| WO | 2007087482 A2 | 8/2007 |
| WO | 2007087483 A2 | 8/2007 |
| WO | 2007/113319 A1 | 10/2007 |
| WO | 2008035171 A2 | 3/2008 |
| WO | 2008157692 A2 | 12/2008 |
| WO | 2009/088335 A1 | 7/2009 |
| WO | 2009/099964 A1 | 8/2009 |
| WO | 2010/011104 A1 | 1/2010 |
| WO | 2010054605 A1 | 5/2010 |
| WO | 20100105232 A1 | 9/2010 |
| WO | 2010/112066 A1 | 10/2010 |
| WO | 2010/141912 A1 | 12/2010 |
| WO | 2011032035 A2 | 3/2011 |
| WO | 2012150887 A1 | 11/2012 |

OTHER PUBLICATIONS

Motorola: "Comparison of PAR and Cubic Metric for Power de-rating", TSG RAN WG4 #31 tdoc# R4-040367, Beijing, China, (56) References Cited

OTHER PUBLICATIONS

May 10-14, 2004, TSG RAN WG1 #37 tdoc# R1040522, Montreal, Canada, May 10-14, 2004, all pages.
Mann, Stephen et al.: "Increasing Talk-Time with Efficient Linear PA'S", IEEE, Feb. 10, 2000, 23 pages.
3GPP TSG RAN WG1, R1-094863 "PCFICH for Multicarrier Operation" Qualcomm Europe; Jeju, Korea, Nov. 9-13, 2009, 4 pages.
3GPP TS 36.211 V10.1.0 (Mar. 2011) 3rd Generation Partnership Project; Technical Specification Group Radio Access Network; Evolved Universal Terrestrial Radio Access (E-UTRA); Physical Channels and Modulation (Release 10), 103 pages.
Draft 3GPP TS 36.212 v10.1.0 (Mar. 2011) 3rd Generation Partnership Project; Technical Specification Group Radio Access Network; Evolved Terrestrial Radio Access (E-UTRA); Multiplexing and channel coding (Release 10), 76 pages.
3GPP; ETSI TS 125 309 V6.6.0; Mar. 2006; 36 pages.
Motorola: "Comparison of PAR and Cubic Metric for Power De-rating", TSG RAN WG1 #37, Tdoc# R1-040642, Montreal, Canada May 10-14, 2004, all pages.
Patrick Hosein and Tao Wu: "Dynamic Power Headroom Threshold for Mobile Rate Determination in a CDMA Network", IEE, May 2004; 5 pages.
Anritsu, Testing the Future, "LTE Resource Guide", www.us.anritsu.com, 2009, all pages.
Yang Li et al.: "LTE power amplifier module design: Challenges and trends", 2010 105H IEEE International Conference on Soldi-State and Integrated Circuit Technology, Nov. 1, 2010, pp. 192-195.
Patent Cooperation Treaty, International Search Report and Written Opinion of the International Searching Authority for International Application No. PCT/US2013/070654, Feb. 24, 2014, 11 pages.
Patent Cooperation Treaty, International Search Report and Written Opinion of the International Searching Authority for International Application No. PCT/US2010/030825, Mar. 8, 2013 11 pages.
The State Intellectual Property Office of the People's Republic of China, Notification of the Fourth Office Action, Aug. 2, 2013, all pages.

United States Patent and Trademark Office, "Non-Final Rejection" for U.S. Appl. No. 13/086,221 dated Jan. 15, 2013, 6 pages.
3GPP TS 36.101 V8.1.0 (Mar. 2008) 3rd Generation Partnership Project; Technical Specification Group Radio Access Network; Evolved Universal Terrestrial Radio Access (E-UTRA); User Equipment (UE) radio transmission and reception (Release 8), 43 pages.
European Patent Office, "Supplementary European Search Report" for European Patent Application No. 07701239.1 dated Sep. 6, 2012, 7 pages.
Korean Intellectual Property Office, Non-Final Office Action for Korean Patent Application No. 10-2008-7017919 dated Feb. 20, 2013, 3 pages.
European Patent Office, "Supplmenetary European Search Report" for European Patent Application No. 07701240.9 Jul. 26, 2012, 8 pages.
3GPP TSG RAN WG1 LTE Adhoc; Tdoc# R1-060023, "Cubic Metric in 3GPP-LTE" Motorola; Helsinki, Finland; Jan. 23-26, 2006, 7 pages.
United States Patent and Trademark Office, "Non-Final Rejection" for U.S. Appl. No. 13/086,203 dated Jun. 21, 2013, 24 pages.
Patent Cooperation Treaty, "PCT Search Report and Written Opinion of the International Searching Authority" or International Application No. PCT/US2012/030682, mailed Jul. 4, 2012.
Patent Cooperation Treaty, "PCT Search Report and Written Opinion of the International Searching Authority" or International Application No. PCT/US2012/030675, mailed Aug. 28, 2012.
European Patent Office, European Search Report and Opinion for EP Patent Application No. 15152010.3, mailed May 6, 2015.
European Patent Office, Extended European Search Report and Opinion for EP Patent Application No. 15152012.9, mailed May 8, 2015.
Motorola, 3GPP TSG RAN1 #54bis, Draft R1-083827, "Common Reference Symbol Mapping/Signaling for 8 Transmit Decisions," Sep. 28-Oct. 3, 2008.
Patent Cooperation Treaty, "PCT Search Report and Written Opinion of the International Searching Authority" or International Application No. PCT/US2007/073204, Jan. 16, 2008.

\* cited by examiner

| FRACTIONAL BWO RELATIVE TO 4.5 MHz | | | | | | | | | | | | COMMENT |
|---|---|---|---|---|---|---|---|---|---|---|---|---|
| 1/12 | 2/12 | 3/12 | 4/12 | 5/12 | 6/12 | 7/12 | 8/12 | 9/12 | 10/12 | 11/12 | 1 | |
| - | NA | - | NA | - | -2.24 | - | -0.55 | - | 0.39 | - | 0.77 | DC CENTERED |
| -0.71 | -0.32 | -0.09 | 0.07 | 0.19 | 0.30 | 0.38 | 0.50 | 0.57 | 0.61 | 0.66 | 0.77 | BAND EDGE |

SPECTRUM EMISSION LEVEL VARIATION IN SCHEDULABLE WIRELESS COMMUNICATION TERMINAL

CROSS REFERENCE TO PRIOR APPLICATIONS

This application is a continuation-in-part of commonly assigned U.S. application Ser. No. 11/459,863, with the same title, filed Jul. 25, 2006, which is incorporated by reference for all purposes.

BACKGROUND

Technical Field

The present disclosure relates generally to wireless communications, and more particularly to spectrum emission level variation in schedulable wireless communication terminals, and corresponding methods.

Background Art

Some effort is being expended during the specification phase of contemporary broadband wireless communication standards such as the 3GPP Long Term Evolution (LTE) project, also referred to as Evolved UMTS Terrestrial Radio Access or E-UTRA, to improve the performance and efficiency of the power amplifier (PA) in mobile terminals or user equipment (UE). Toward this objective, there are a number of key performance metrics, but the over-riding goal is to minimize the PA power consumption (or peak and/or mean current drain), cost and the complexity required to deliver a given specified conducted power level, for example, +21 dBm or +24 dBm, to the UE antenna.

Generally, the required conducted power level must be achieved within a specified lower bound on in-band signal quality, or error vector magnitude (EVM) of the desired waveform, and an upper bound of signal power leakage out of the desired signal bandwidth and into the receive signal band of adjacent or alternate carrier Node B receivers or the signal band of adjacent or alternate carrier UE transmitters. These effects may be subsumed into the broader term "waveform quality".

These problems represent classical PA design challenges, but emerging broadband wireless networks such as 3GPP LTE must solve these problems in the context of new modes of system operation. For example, power amplifier (PA) operation must be optimized while transmitting new waveform types, including multi-tone waveforms and frequency-agile waveforms occupying variable signal bandwidths (within a nominal bandwidth, sometimes referred to as a channel or carrier bandwidth). Further, PA performance must now be optimized in a predominantly packet switched (PS) network where a network entity, such as a base station, schedules multiple wireless communication entities or terminals to transmit simultaneously. PA performance also must be optimized in the presence of numerous different frequency or spatially adjacent radio technologies, including GSM, UMTS, WCDMA, unlicensed transmitter and receivers, among other radio technologies.

BRIEF DESCRIPTION OF THE DRAWINGS

The various aspects, features and advantages of the disclosure will become more fully apparent to those having ordinary skill in the art upon careful consideration of the following Detailed Description thereof with the accompanying drawings described below. The drawings may have been simplified for clarity and are not necessarily drawn to scale.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Before describing in detail embodiments that are in accordance with the present invention, it should be observed that the embodiments reside primarily in combinations of method steps and apparatus components related to controlling spectrum emission levels from wireless communication circuits as described herein. Any process descriptions or blocks in flow charts should be understood as representing modules, segments, or portions of code which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of spectral emission control, as well as corresponding methods and devices. The non-processor circuits may include, but are not limited to, a radio receiver, a radio transmitter, signal drivers, clock circuits, power source circuits, and user input devices. As such, these functions may be interpreted as steps of a method to perform spectral emission control. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Figure 1:
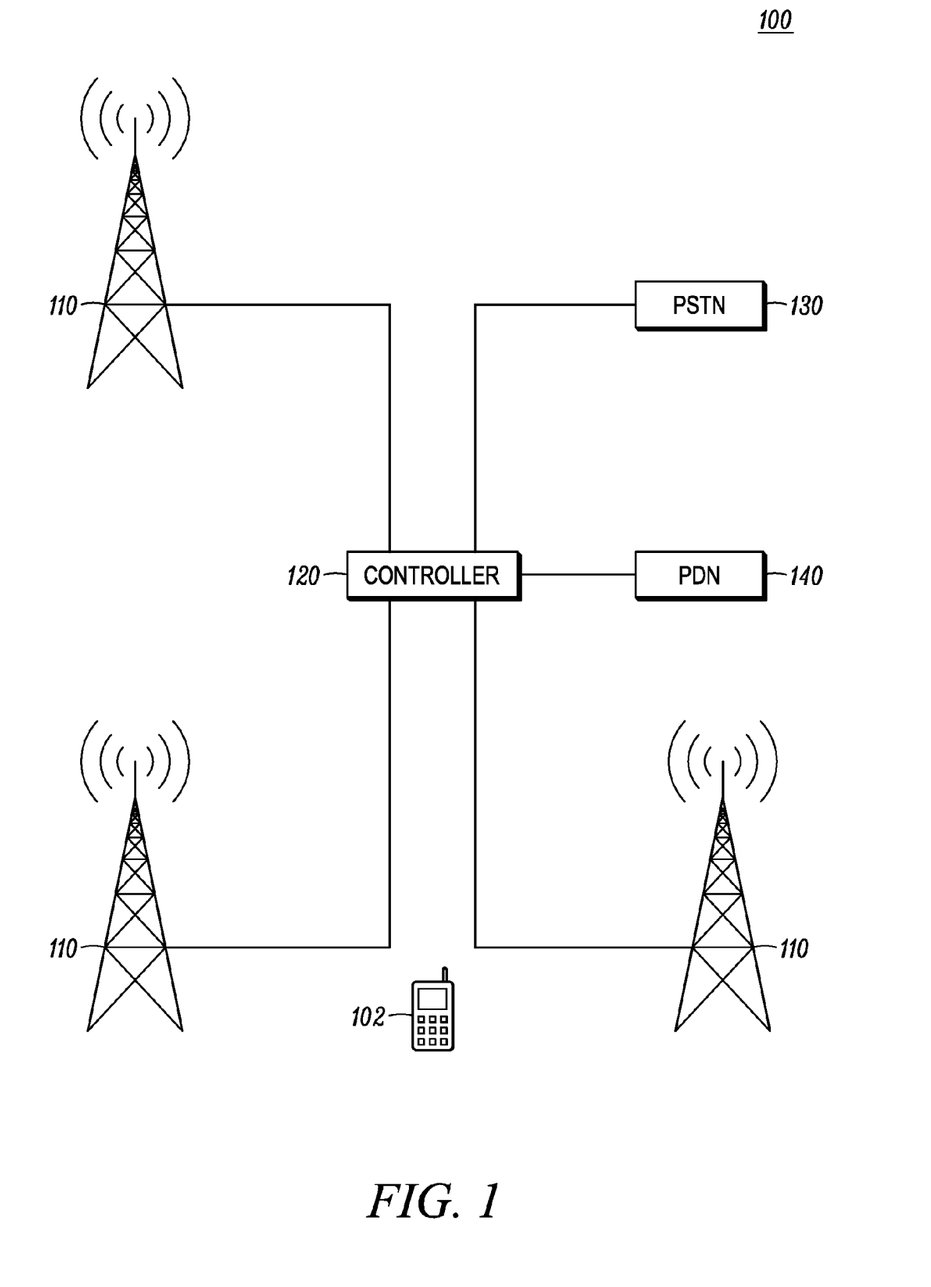
FIG. 1 illustrates an exemplary wireless communication system.

In FIG. 1, the exemplary wireless communication system comprises a cellular network including multiple cell serving base stations 110 distributed over a geographical region. The cell serving base station (BS) or base station transceiver 110 is also commonly referred to as a Node B or cell site wherein each cell site consists of one or more cells, which may also be referred to as sectors. The base stations are communicably interconnected by a controller 120 that is typically coupled via gateways to a public switched telephone network (PSTN) 130 and to a packet data network (PDN) 140. The base stations additionally communicate with mobile terminals 102 also commonly referred to as User Equipment (UE) or wireless terminals to perform functions such as scheduling the mobile terminals to receive or transmit data using available radio resources. The network also comprises management functionality including data routing, admission control, subscriber billing, terminal authentication, etc., which may be controlled by other network entities, as is known generally by those having ordinary skill in the art.

Exemplary cellular communication networks include 2.5 Generation 3GPP GSM networks, 3rd Generation 3GPP WCDMA networks, 3GPP Long Term Evolution (LTE) networks, and 3GPP2 CDMA communication networks, among other existing and future generation cellular communication networks. Other networks include the Universal Mobile Telecommunications System (UMTS) networks, Evolved Universal Terrestrial Radio Access (E-UTRA) networks. The network may also be of a type that implements frequency-domain oriented multi-carrier transmission techniques, such as Frequency Division Multiple Access (OFDM), DFT-Spread-OFDM, IFDMA, etc. Single-carrier based approaches with orthogonal frequency division (SC-FDMA), particularly Interleaved Frequency Division Multiple Access (IFDMA) and its frequency-domain related variant known as DFT-Spread-OFDM (DFT-SOFDM), are attractive in that they optimize performance when assessed using contemporary waveform quality metrics, which may include peak-to-average power ratio (PAPR) or the so-called cubic metric (CM). These metrics are good indicators of power "backoff" or power de-rating necessary to maintain linear power amplifier operation, where "'linear'" generally means a specified and controllable level of distortion both within the signal bandwidth generally occupied by the desired waveform and in neighboring frequencies.

In OFDM networks, both Time Division Multiplexing (TDM) and Frequency Division Multiplexing (FDM) are employed to map channel-coded, interleaved and data-modulated information onto OFDM time/frequency symbols. The OFDM symbols can be organized into a number of resource blocks consisting of M consecutive sub-carriers for a number N consecutive OFDM symbols where each symbol may also include a guard interval or cyclic prefix. An OFDM air interface is typically designed to support carriers of different bandwidths, e.g., 5 MHz, 10 MHz, etc. The resource block size in the frequency dimension and the number of available resource blocks are generally dependent on the bandwidth of the system.

Figure 2:
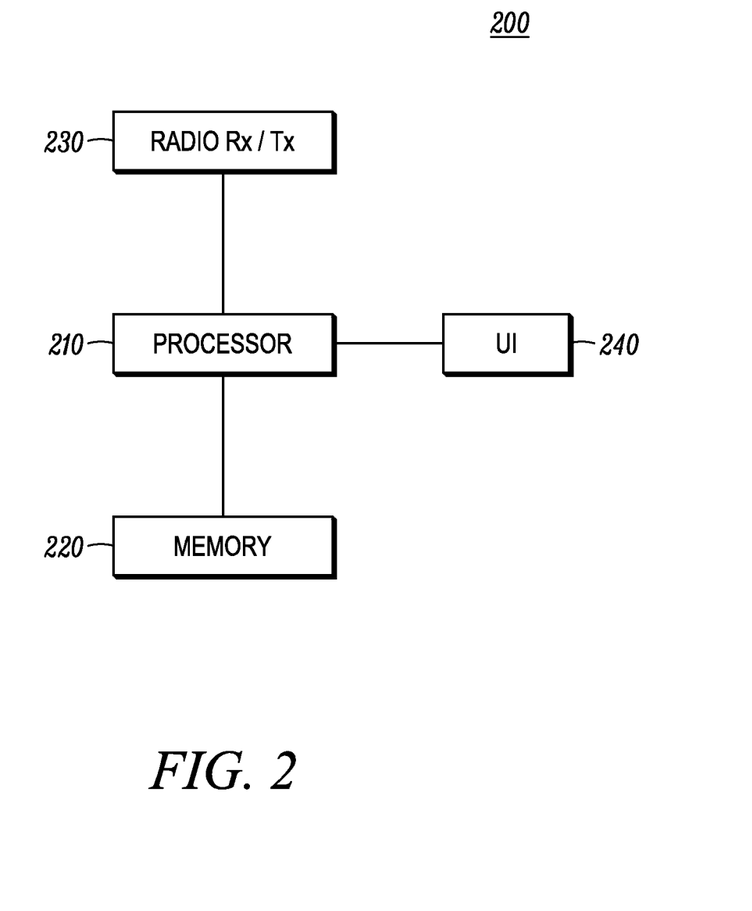
FIG. 2 illustrates a wireless communication entity.

In FIG. 2, the exemplary wireless terminal 200 comprises a processor 210 communicably coupled to memory 220, for example, RAM, ROM, etc. A wireless radio transceiver 230 communicates over a wireless interface with the base stations of the network discussed above. The terminal also includes a user interface (UI) 240 including a display, microphone and audio output among other inputs and outputs. The processor may be implemented as a digital controller and/or a digital signal processor under control of executable programs stored in memory as is known generally by those having ordinary skill in the art. Wireless terminals, which are referred to as User Equipment (UE) in WCDMA networks, are also referred to herein as schedulable wireless communication entities, as discussed more fully below.

User equipment operating in a cellular network operate in a number of 'call states' or 'protocol states' generally conditioned on actions applicable in each state. For example, in a mode typically referred to as an 'idle' mode, UE's may roam throughout a network without necessarily initiating or soliciting uplink or downlink traffic, except, e.g., to periodically perform a location update to permit efficient network paging. In another such protocol state, the UE may be capable of initiating network access via a specified shared channel, such as a random access channel. A UE's ability or need to access physical layer resources may be conditioned on the protocol state. In some networks, for example, the UE may be permitted access to a shared control channel only under certain protocol-related conditions, e.g., during initial network entry. Alternatively, a UE may have a requirement to communicate time-critical traffic, such as a handover request or acknowledgement message, with higher reliability. In such protocol states, the UE may be permitted, either explicitly by the network, by design, or by a controlling specification, such as a 3GPP specification, to adjust its maximum power level depending on its protocol state.

Generally, a wireless communication network infrastructure scheduling entity located, for example, in a base station (110) in FIG. 1, allocates or assigns radio resources to schedulable wireless communication entities, e.g., mobile terminals, in the wireless communication network. In FIG. 1, the base stations (110) each include a scheduler for scheduling and allocating resources to mobile terminals in corresponding cellular areas. In multiple access schemes such as those based on OFDM methods, multi-carrier access or multi-channel CDMA wireless communication protocols including, for example, IEEE-802.16e-2005, multi-carrier HRPD-A in 3GPP2, and the long term evolution of UTRA/UTRAN Study Item in 3GPP (also known as evolved UTRA/UTRAN (EUTRA/EUTRAN)), scheduling may be performed in the time and frequency dimensions using a Frequency Selective (FS) scheduler. To enable FS scheduling by the base station scheduler, in some embodiments, each mobile terminal provides a per frequency band channel quality indicator (CQI) to the scheduler.

In OFDM systems, a resource allocation is the frequency and time allocation that maps information for a particular UE to resource blocks as determined by the scheduler. This allocation depends, for example, on the frequency-selective channel-quality indication (CQI) reported by the UE to the scheduler. The channel-coding rate and the modulation scheme, which may be different for different resource blocks, are also determined by the scheduler and may also depend on the reported CQI. A UE may not be assigned every sub-carrier in a resource block. It could be assigned every Qth sub-carrier of a resource block, for example, to improve frequency diversity. Thus a resource assignment can be a resource block or a fraction thereof. More generally, a resource assignment is a fraction of multiple resource blocks. Multiplexing of lower-layer control signaling may be based on time, frequency and/or code multiplexing.

Figure 3:
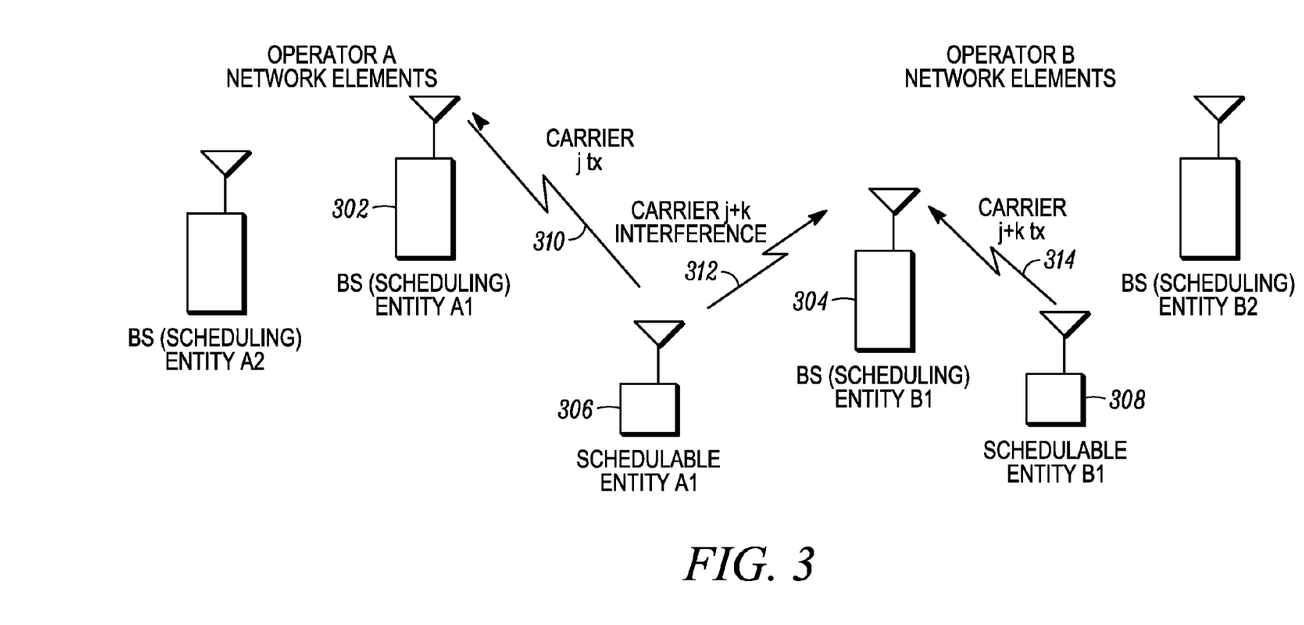
FIG. 3 illustrates neighboring communication networks.

The interference impact of a network entity, for example, a schedulable wireless communication terminal, to an uncoordinated adjacent band entity, referred to as the victim, is shown in FIG. 3. Victim entities may be base stations or mobile terminals in immediately adjacent bands or in non-contiguous adjacent bands, all of which are generally referred to as neighboring bands. The victim receiver may operate on or belong to the same or different technology as the network entity producing the interference. The victim receiver may also operate on or belong to the same or different network types managed either by the same (coordinated) operator or by a different (uncoordinated) operator. The victim receiver may also operate on belong to a different technology network where there is no coordination between networks to reduce interference.

Regional or international spectrum regulatory authorities frequently designate contiguous segments of radio frequency spectrum, or radio bands for use by specific duplexing modes, for example, frequency division duplexing (FDD) or time-division duplexing (TDD) or by specific wireless technologies, such as Group Special Mobile (GSM), Code Division Multiple Access (CDMA), Wideband CDMA, etc. For example, GSM networks are frequently granted access to the so-called GSM 900 MHz (or Primary GSM) band specified as the frequency-duplex pair of band between the frequencies 890-915 MHz and 935-960 MHz. This information may be stored in the UE or transmitted by the network controlling a UE in order to permit an optimum choice of PA output power back-off (also referred to as a power de-rating) or more generally to optimally adjust the maximum power level of the PA conditioned on adjacent channel interference offered to, and consistent with, the known adjacent channel technologies.

More generally, a frequency band adjacent to such a UE may be known from national or international regulations or from general deployment criteria, such as 'licensed' or 'unlicensed' designations to be subject to specific maximum levels of interference from the band in which the UE is operating. When this information is stored in the UE or made available by signaling from the network, the UE may optimize its radiated power level subject to the known adjacent band interference limits.

In FIG. 3, a schedulable entity A1 306 is scheduled aperiodically. Particularly, the entity A1 is allocated radio resources including bandwidth on carrier j 310 as well as bandwidth location in the carrier j band. The entity A1 is also allocated its transmission power assignment or power adjustment and a scheduling grant by the base station scheduling entity A1 302, which is part of network A. Schedulable entity A1 306 transmits using its assigned bandwidth on carrier j 310 when scheduled by BS scheduling entity A1 302 and creates out of band emissions which impinge upon other carriers including an adjacent carrier j+k and is seen as interference 312 by BS scheduling entity B1 304, which is the victim receiver or entity, resulting in reduced SNR when receiving a scheduled transmission from schedulable entity B1 308 on carrier j+k 314. Since base station entity B1 304 is part of Network B and there is no coordination, or sub-optimal coordination, between Network A and Network B then it may not be possible for scheduling entities like 306 and 308 to avoid mutual interference.

In FIG. 3, the degree to which schedulable entity A1 306 interferes with schedulable entity B1 308 on carrier j+k 314 is dependent on the radio frequency (RF) distance (also referred to as path loss) between the schedulable wireless communication entity and the other wireless communications (victim) entity. The interference is also dependent on the effective radiated power level of the transmitter, the size and amount of separation of the bandwidth allocations between entities and the amount of overlap in time. Out of band emissions of one transmitter will have smaller impact on another receiver if the path loss between the transmitter and victim receiver is larger, and the impact will be larger if the path loss is smaller. Adjacent channel interference is also present in TDD systems where both the BS 302 and schedulable entity 306 of Network A transmit on the same carrier 310 and both BS 304 and schedulable entity 308 of Network B transmit on the same carrier 314 and hence both BS 302 and schedulable entity 306 cause out of band emissions and hence interference 312 to adjacent carrier 314.

In one embodiment, the radio resource allocated to a schedulable wireless communication entity is based on an interference impact of the schedulable wireless communication entity operating on the radio resource allocated. The interference impact may be based on any one or more of the following factors: a transmission waveform type of the schedulable wireless communication entity; a maximum allowed and current power level of the schedulable wireless communication entity; bandwidth assignable to the schedulable wireless communication entity; location of the assignable bandwidth in a carrier band; radio frequency distance (path loss) relative to another wireless communications entity; variation in the maximum transmit power of the schedulable wireless communication entity for the assigned bandwidth; separation of assigned band relative to the other wireless communication entity; reception bandwidth of the victim entity, minimum SNR required for operation of the victim entity; the identified band upon which a schedulable wireless entity is supposed to transmit; the nearness of dedicated bands upon which the schedulable wireless entity is not supposed to transmit or interfere with, e.g., bands that have sensitive bands with reduced emissions requirements such as Band 13 which is adjacent to a the public safety band; and reception multiple access processing (e.g. CDMA, OFDM, or TDMA), among other factors. The variation in the maximum transmit power includes de-rating or re-rating the maximum transmit power of the wireless communication entity as discussed further below.

For a given carrier band and band separation, transmissions with larger occupied bandwidth (OBW) create more out of band emissions resulting in a larger adjacent or neighbor channel leakage ratio (ACLR) than transmissions with smaller OBW. The increase in out of band emissions from transmissions with larger OBW is due largely to increased adjacent channel occupancy by 3rd and 5th order intermodulation (IM) products. The 3rd order IM product largely determines ACLR in adjacent bands. The 5th order IM product plateau largely determines ACLR in more distant (non-contiguous adjacent) bands. Note, however that in networks such as IEEE 802.16e-2005 and 3GPP LTE networks which support multiple bandwidth types, the dimensions in frequency of the adjacent band would also control such relationships. To avoid the relative increase in ACLR due to larger OBW, it is generally necessary to reduce or de-rate transmission power created by the interfering entity in proportion (although not necessarily linearly so) to the increase in OBW. Given a reference OBW (OBW.sub.REF) with a known (e.g. 0) power de-rating (PD.sub.REF) needed to meet a specified ACLR, an occupied bandwidth power de-rating (OBPD) can be defined for an arbitrary OBW relative to the reference OBW. The OBPD can be obtained empirically but may also be approximated mathematically by an equation such as:

$$OBPD.gtoreq.10 \log.sub.10(OBW/IOBW.sub.ref) \quad (1)$$

Generally, the transmission power of the mobile terminal must be reduced by OBPD to keep adjacent channel power leakage and therefore ACLR the same for a transmission with a larger OBW compared to one with a smaller reference OBW. The total power de-rating (TPD) needed to account for both an occupied bandwidth power de-rating (OBPD) and a waveform power de-rating (WPD) in order to meet a given ACLR requirement can be represented by:

$$TPD=f(OBPD,WPD) \quad (2)$$

Note that the function f(.) may, for example, be the simple summation of OBPD and WPD. The WPD accounts for waveform attributes such as modulation and number of frequency or code channels and can be determined empirically through power amplifier measurements or indicated by a waveform metric such as the Cubic Metric (CM). The additional power de-rating from OBPD (beyond WPD alone) generally means worse cell edge coverage for wireless terminals unless mitigated. For example, a transmission with 4.5 MHz occupied bandwidth on a 5 MHz E-UTRA carrier with a fixed 5 MHz carrier separation will have a larger measured ACLR (e.g., approximately −30 dBc instead of −33 dBc) with regard to the adjacent 5 MHz carrier than a transmission with only 3.84 MHz occupied bandwidth. To reduce the ACLR back to −33 dBc requires an OBPD of approximately 0.77 dB (based on empirical measurements) which is close to the 0.70 dB given equation (1) above based on OBW of 4.5 MHz and OBW.sub.REF=3.84 MHz.

The cubic metric (CM) characterizes the effects of the 3rd order (cubic) non-linearity of a power amplifier on a waveform of interest relative to a reference waveform in terms of the power de-rating needed to achieve the same ACLR as that achieved by the reference waveform at the PA rated power. For example, a UE with power class of 24 dBm can nominally support a rated maximum power level (PMAX) of 24 dBm. In practice, the UE's current, or instantaneous, or local maximum power level is limited to the operational maximum power level given by PMAX-f(OBPD,WPD) where f(.) can, for example, be the simple summation of OBPD and WPD such that the operational maximum power level is PMAX-(OBPD+WPD). The difference between PMAX and the UE's current power level after power control or after assignment of an arbitrary power level less than PMAX is called the UE's power margin or power headroom. Scheduling can be used to reduce or avoid OBPD.

In one embodiment, the scheduler allocates the radio resource based on the interference impact by assigning bandwidth based on power headroom of the schedulable wireless communication entity. Particularly, the scheduler finds a bandwidth size that reduces OBPD enough such that operational maximum power (PMAX-OBPD−WPD) does not limit current power of the schedulable wireless communication entity.

A scheduler may control leakage into adjacent and non-contiguous adjacent bands by scheduling mobile terminals that are "close" to the serving cell in terms of path loss with bandwidth allocations that occupy the entire carrier band or a bandwidth allocation that includes resource blocks (RB's) that are at the edge of the carrier band (e.g., 5 MHz UTRA or LTE carrier) since due to power control it is very unlikely that such a terminal will be operating at or near to PMAX and therefore unlikely that its current power level would be limited by the operational maximum power. A scheduler may schedule terminals that have little or no power margin with bandwidth allocations that exclude resource blocks at the carrier band edge therefore reducing OBPD and reducing the likelihood of the terminal being power limited by the operational maximum power. In another scheduling scenario, the user terminal is scheduled with low path loss for all but the resource blocks at the band edge to mitigate the OBPD that would otherwise be required. The user terminal with high path loss would be scheduled for those band edge resource blocks because its OBPD would be less since the OBW is relatively small. It is possible to preserve frequency diversity for terminals assigned a smaller transmission bandwidth to minimize OBPD by using RB hopping over a longer scheduling time interval composed of several frames. Signaling overhead may be reduced by using pre-determined hopping patterns, or pre-defined logical physical permutations. A UE will determine the OBPD corresponding to its scheduled or allocated bandwidth size and location of the allocated bandwidth in the carrier band. The UE therefore computes an operational maximum power for every scheduled transmission to determine if the current power level will be limited.

Figure 4:
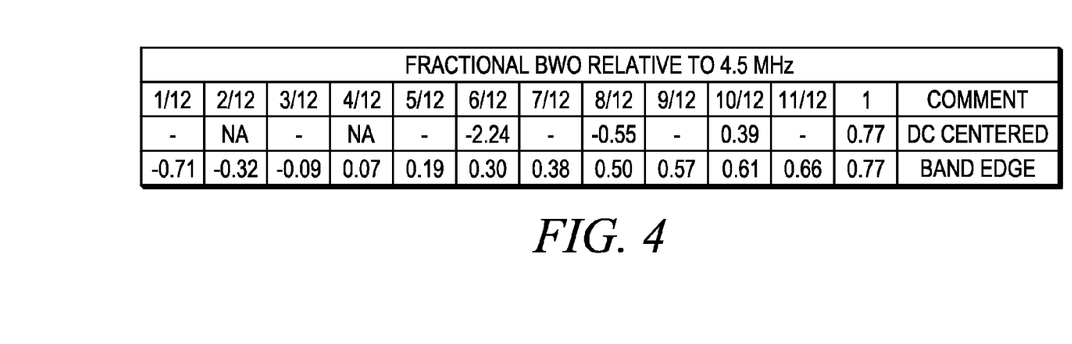
FIG. 4 illustrates occupied bandwidth power de-rating values.

In some embodiments, the schedulable wireless communication entity obtains maximum transmitter power information based on the radio resource assignment from reference information stored on the mobile terminal. For example, the maximum transmit power information may be obtained from a look-up table stored on the wireless terminal. Illustrating by example, in a 3GPP LTE system, band 13 has an emission-sensitive adjacent US Public Safety Band. Accordingly, in one embodiment, a BS is configured to signal band 13 A-MPR, e.g., 12 dB, with a NS_07 signaling flag. When this occurs, i.e., when NS_07 signaling is enabled, the output power of the PA can be reduced up to a maximum of 12 dB, depending upon the resource allocation, to ensure that emission restrictions in the emission-sensitive adjacent US Public Safety Band are met. This setting can be pulled from a look-up table stored on the wireless terminal. Note that the actual power output level may be other than 12 dB, as it will be determined by the appropriate 3GPP or other specification for the emission-sensitive adjacent band. Accordingly, a value of 12 dB is explanatory only, as the actual value could be different, such as 14 dB or 15 dB, depending upon the applicable specification. Alternatively, the maximum transmit power information may be obtained in an over-the-air message. Several examples of the relationship between the radio resource assignment and the maximum transmit power adjustment are discussed more fully below. FIG. 4 illustrates exemplary OBPD de-rating values.

A BS may execute such scheduling decisions not simply from considerations of interference offered by a UE to frequency-adjacent BS's, but may also simultaneously optimize the performance of multiple UE's whose allocated resources are derived from a common set of carrier frequency resources (possibly extending over more than one carrier frequency). That is, the BS may optimize its scheduling allocations from consideration of the mutual interference offered between a multiplicity of UE's.

The power radiated into an adjacent frequency band by a UE, and the distortion offered by a UE to a BS receiver (or other UE receiver in the case of a TDD system) within the set of time-frequency resources allocated by the BS, is governed by several practical design criteria related to the implementation of mobile terminal transmitters, including oscillator phase noise, digital-analog converter noise, power amplifier (PA) linearity (in turn controlled by power amplifier mode, cost, power consumption etc.), among others.

Generally, however, and in common with most non-linear transformations expandable in terms a polynomial power series, UE power amplifiers give rise to undesired adjacent band interference in broad proportion, for a given PA design, to the mean power offered to the PA input. As a consequence of 3rd or 5th order polynomial terms, the frequency at which interference occurs is at 3 or 5 times the frequency of the input signal components, or harmonics thereof. Also, the power of such out-of-band components generally increases at 3 or 5 times the rate of increase of the input power level.

Accordingly, mobile terminals may control their out of band emission levels by limiting the power to the PA. Given a specific rated maximum output (or input) power level designed to achieve a given level of interference into an adjacent frequency band, or level of in-band distortion, a mobile terminal may elect to adjust, for example, reduce its input power level in order to reduce such unwanted effects. The mobile terminal may also keep its power at a given level, but adjust its operating point (load, bias, supply, etc.) to effect adjustment of the emission levels. Alternatively, in one embodiment an envelope tracking power supply (ETPS) is used to deliver power to the PA instead of DCDC converter. An ETPS modulates the PA supply voltage in accordance with the RF amplitude modulation to lower the average supply voltage and improve current drain without clipping amplitude peaks and degrading PA linearity. Where an ETPS is used power can be limited upon resource signaling, such as receipt of a NS_07 signaling flag. When NS_07 is signaled, the ETPS waveform shaper could be adjusted for maximum linearity. As described elsewhere herein, a decision to increase or decrease the input or output PA power may be subject to other criteria, including waveform bandwidth, location in a frequency band, waveform quality metric, among others.

Generally, attributes of the waveform entering the power amplifier, along with attributes of network or UE operational parameters (such as the desired level of out of band emissions, in-band distortion, or other criteria described herein) are input to a controller which executes a pre-defined power adjustment function, or de-rating function f (x1, x2, x3, . . . , xN) which relates the attributes x1 etc. to a maximum power level (where it is understood that de-rating may refer to a power level in excess, or less than, a nominal or rated maximum power level).

Figure 6:
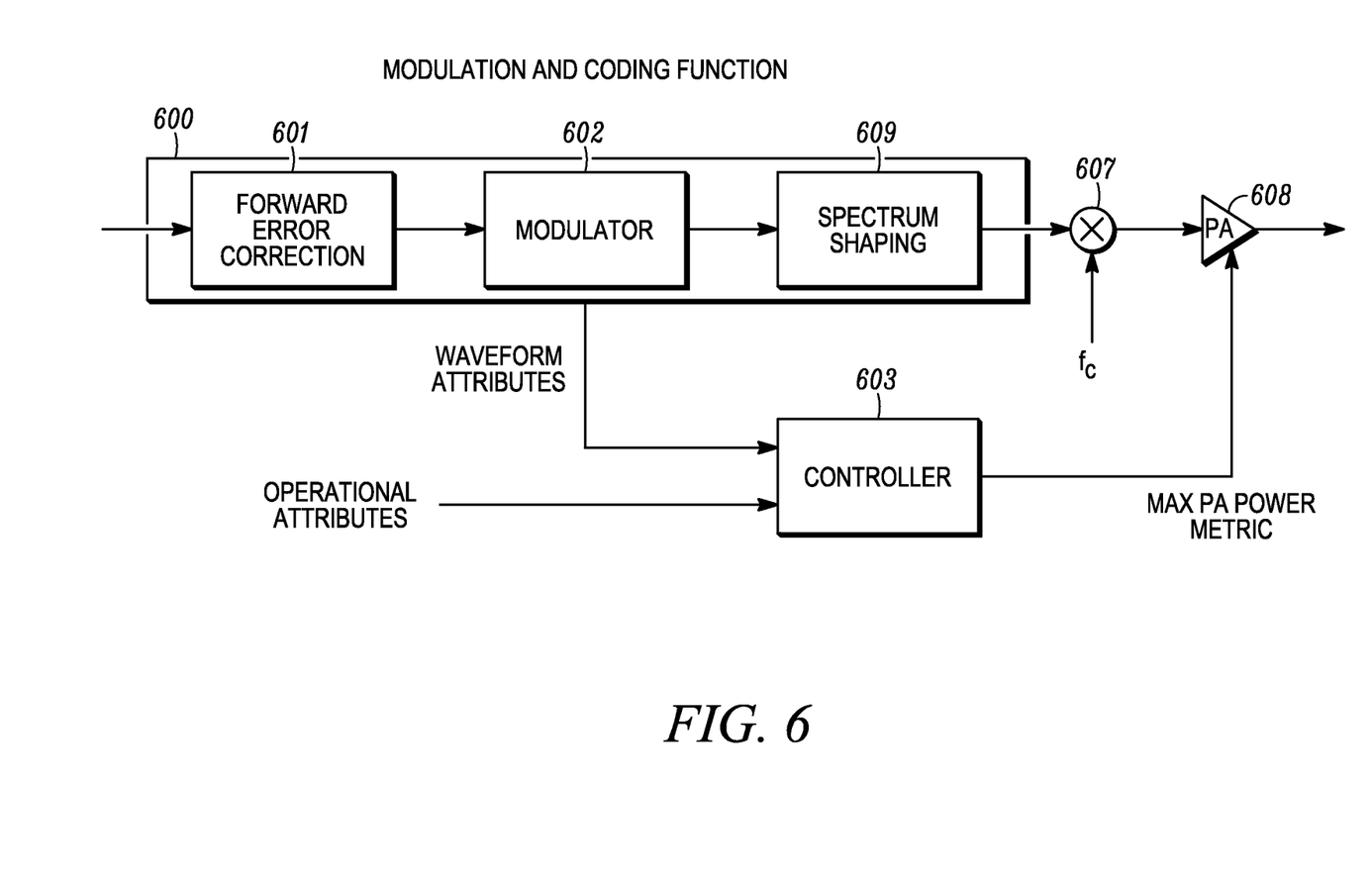
FIG. 6 illustrates a power amplifier under control of a controller modifying the maximum power level.

In FIG. 6, a modulation and coding function 600 accepts an information bit stream, such as higher layer protocol data units, and then applies techniques such as forward error correction 601, modulation 609, and linear and non-linear spectrum shaping methods prior to frequency conversion 607 and input to a PA 608. A controller 603 may derive waveform attributes from the configuration of the modulation and coding function 600 or from direct observation of the signal immediately prior to frequency conversion 607. The controller 603 may also derive operational attributes from stored parameters or parameters signaled by the network. Illustrating by example, in one embodiment NS signaling from the network is used. For band 13, the NS signaling comprises sending an NS_07 signaling flag. Accordingly, when NS_07 signaling is enabled, the PA supply voltage can be set for maximum output power. When NS_07 signaling is disabled, the PA supply voltage can be optimized to balance ACLR with current drain efficiency to improve, for example, average Band 13 PA current drain. Moreover, the controller 603 can then use the waveform attributes, which may include signal bandwidth, frequency location, among others, plus the operational attributes such as operational band, adjacent technology among others, to adjust the permitted maximum PA voltage level 605 which is offered as a control metric to the PA 608. Note that for bands other than band 13, such as band 26, the NS signaling will be different. Illustrating by example, NS signaling for band 26 could comprise sending any of a NS_12 signaling flag, a NS_13 signaling flag, a NS_14 signaling flag, or a NS_15 signaling flag.

In one embodiment, the operational parameters shown in FIG. 6 are used in conjunction with one or more look-up tables 609 to adjust the voltage level 605 of the PA 608. In one embodiment, the look-up tables 609 comprise a first "band 13" DCDC voltage value look-up table that is used when NS_07 signaling is active, and a second band 13 DCDC voltage value look up table that is used when NS_07 signaling is not active. Where included, the operational parameter considered by the controller 603 can be whether NS_07 signaling flags (or other NS signaling flags for other bands) are being received by the UE from the BS. The controller 603 can then switch between the first band 13 DCDC voltage value look-up table and the second band 13 DCDC voltage value look up table based upon NS_07 signaling. The first band 13 DCDC voltage value look-up table, referred to as the 'NS_07-enabled' table, would direct the controller 603 to set the supply voltage level 605 of the PA 608 for a maximum over the top output power of 12 dB to ensure that adjacent band (public safety) emissions specifications are met. The second band 13 DCDC voltage value look-up table, referred to as the 'NS_07-disabled' table, would direct the controller 603 to optimize the voltage level 605 of the PA 608 for optimal efficiency based upon a balance of ACLR and current drain in the PA 608.

The use of the look-up tables 609 advantageously allows improvement in the band 13 PA current drain. Experimental testing has shown that the improvement can be about eighteen percent, as the current drain is reduced from 193 mA to 158 mA. The use of the look-up tables 609 further facilitates using other methods currently in use to mitigate current drain.

It should be noted that band 26, which is a superset of band 5, is another band being contemplated to have strict adjacent band emissions standards similar to those of band 13. For example, it is contemplated that band 26 may have a requirement as high as 12 dB additional maximum power reduction (A-MPR), which would be equivalent to that set forth for band 13. Accordingly, usage of the look-up tables 609 would provide similar current drain adjustments to that expected with band 13.

In one embodiment, the radio resource allocated to a schedulable wireless communication entity is based on a maximum power available to the schedulable wireless communication entity for the radio resource allocated along or in combination with other factors, for example, the interference impact. For a particular radio resource allocation, the scheduler knows the maximum transmit power of the corresponding schedulable wireless communication device. The scheduler may thus use this information to manage the scheduling of schedulable wireless communication entities, for example, to reduce interference.

In some embodiments, the scheduler determines a bandwidth size of the radio resource and allocates determined bandwidth to the schedulable wireless communications. The scheduler may also determine where within a carrier band the assigned radio resource is located. In one particular implementation, the scheduler allocates bandwidth nearer an edge of a carrier band when the schedulable wireless communication entity requires less transmit power, and the scheduler allocates bandwidth farther from the edge of the carrier band when the schedulable wireless communication entity requires more transmit power. These allocations of course may depend on the interference impact, for example, the proximity of neighboring carrier bands among other factors discussed herein. In another implementation, the scheduler allocates a radio resource to the schedulable wireless communications entity nearer an edge of a carrier band when a radio frequency distance between the schedulable wireless communication entity and the other wireless communications entity is larger, and the scheduler allocates the radio resource to the schedulable wireless communications entity farther from the edge of the carrier band when the radio frequency distance between the schedulable wireless communication entity and the other wireless communications entity is smaller.

Figure 5:
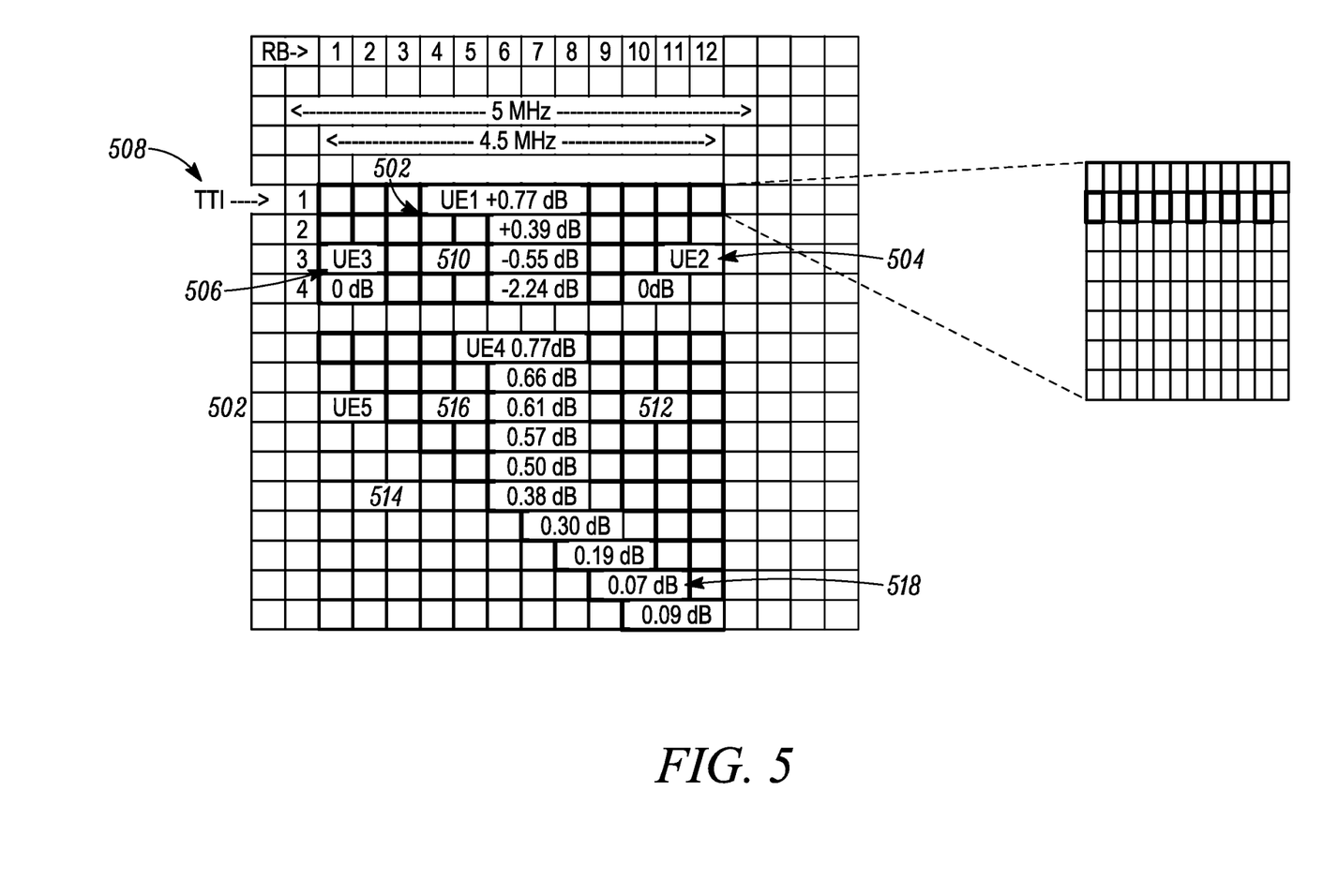
FIG. 5 illustrates a radio resource assignment to multiple entities.

FIG. 5 illustrates, for successive transmission time intervals or TTI's (frames) 508, resource allocations to UE1 502 that are centered in the allocable band about DC and allocations for UE2 504 and UE3 506 located at each band edge. FIG. 5 shows a carrier band of 5 MHz with 4.5 MHz of allocable bandwidth in units of 375 kHz resource blocks (RB's) such that 12 RB's span the entire 4.5 MHz. Adjacent carriers are on either side of the 5 MHz carrier and are typically separated by a guard band. Out of band emissions decrease more rapidly when band edge occupancy is reduced or avoided. Therefore, reducing the size of band centered allocations as shown by UE1 502 means OBPD also decreases more rapidly 510. If, for example, two or more RB's at the band edge are not allocated then the OBPD may be less than 0. Out of band emissions (and OBPD 516) for allocations that include band edge RB's as shown for UE4 512 and UE5 514 decrease more slowly as the allocation is reduced compared to Band centered allocations. In the particular example shown, not until the occupancy of a resource allocation with band edge RB's 512 UE4 drops below ⅓ of the total allocable band does the OBPD drop below zero 518.

Figure 7A:
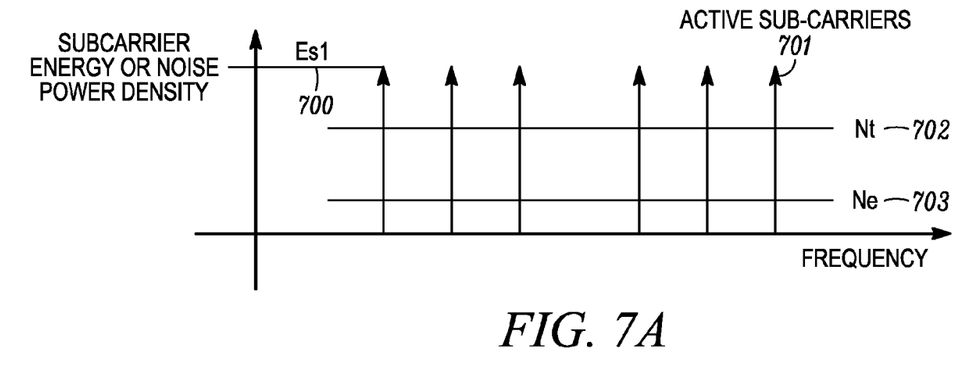
FIG. 7A illustrates a waveform and frequency sub-carriers transmitted by a UE shown with impairments attributable to practical limitations of a UE transmitter.

The BS may enhance its ability to optimally adjust the maximum permitted power level of UE's under the control of the BS by occasionally measuring the BS receiver noise power contribution arising from reduced transmitter waveform quality among UE's. FIG. 7a illustrates this method in more detail in the context of OFD transmissions, or more generally transmissions comprising multiple sub-carriers. Specifically, a UE is shown transmitting on a set of active frequency sub-carriers 701 received at the BS receiver with a specific energy per sub-carrier Es1 700 and with an associated signal-noise ratio Es1/Nt with respect to the BS receiver thermal noise power density Nt 702.

In FIG. 7a, the waveform and hence frequency sub-carriers transmitted by the UE are also subject to impairments attributable to practical limitations of the UE transmitter. Although such impairments generally have frequency dependency, they may be regarded, to a first approximation, as a frequency-invariant additive noise power spectral density shown, at reception by the BS receiver, as a noise power density Ne 703. Generally, the UE transmitter performance is such that the received noise density Ne due to transmitter impairments is received at a level sufficiently below the BS receiver thermal noise density Nt so as to lead to a negligible increase in the effective total receiver noise density, i.e., Nt+Ne=Nt.

Figure 7B:
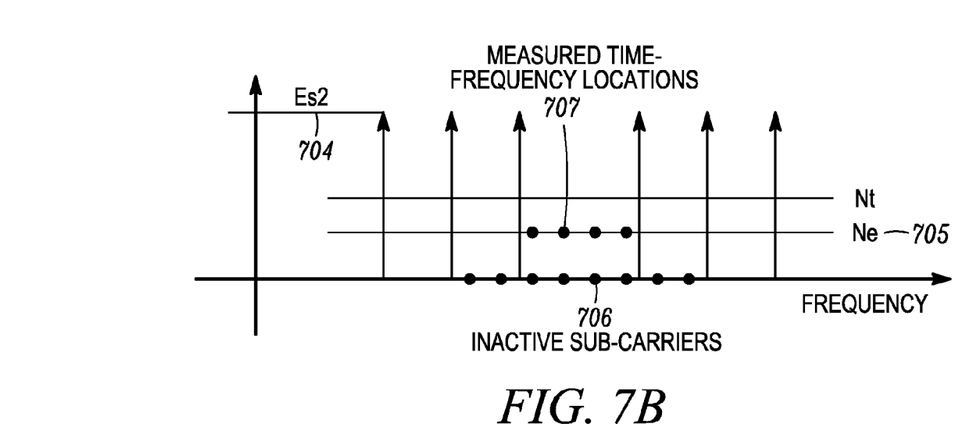
FIG. 7B illustrates, when operating under specific conditions, for example, when located at an edge of uplink cell coverage or when located adjacent to emissions sensitive bands, it can be beneficial for the UE to adjust its maximum transmitter power level so as to increase the effective received energy per sub-carrier $Es2$.

In FIG. 7b, when operating under specific conditions, for example, when located at the edge of uplink cell coverage or when located adjacent to emissions sensitive bands, it may be beneficial for the UE to adjust its maximum transmitter power level so as to increase the effective received energy per sub-carrier Es2 704, or alternatively to ensure that emissions requirements in the adjacent emissions sensitive bands are met. Due to the non-linear nature of the power amplifier, this may give rise to a proportionally larger (in dB) increase in the received noise density Ne 705 due to transmitter impairments, but if Ne remains at a level smaller than Nt, a net benefit in sub-carrier signal-noise ratio can accrue.

One such condition occurs when the BS signals a UE that is operating near and adjacent sensitive band. For low data rate signals such as WCDMA voice, the probability of transmitting at high output power levels is very low. However, when using higher data rate signals such as those found in 3GPP LTE networks, test data has shown that a PA may spend a quarter of its transmission time transmitting at maximum power levels and half of its time within the highest 10 dB of its transmission power rating. PA efficiency, and therefore current drain, is limited by linearity requirements when transmitting at high power. While ACLR in a victim band can be the limiting factor, certain bands—such as Band 13 and Band 26 in 3GPP LTE networks—have strict emissions requirements due to their proximity of sensitive adjacent bands, one example of which is the US Public Safety band (in the case of band B13 and bands B26 and its corresponding subset band B5). Examining band 13, this band allows up to 12 dB of A-MPR to meet the tight emissions requirements. Adding the look-up tables (609) described with reference to FIG. 6 above allows a controller (603) or other device to switch between the two tables based on NS_07 signaling as previously described.

In order to permit the UE to optimize the ratio of Es/Ne at the transmitter, the BS may broadcast an indication of a) the BS receiver thermal noise density Nt, b) the received noise component Ne due to UE transmitter impairments, or c) a combination, sum, or some function of those measures. The UE may then optimize its maximum transmitter power level to optimize the sub-carrier signal-noise ratio or adjust the operating point as discussed above. For example, if the UE had available, from downlink power measurements, for example, an estimate of the path loss between the BS and UE, the UE may select the maximum radiated power level such that the received energy per sub-carrier and associated receiver noise power density Ne, due to transmitter impairments, is optimized. In support of this, the BS may elect to schedule specific time-frequency instances, or measurement opportunities, where a known set of sub-carriers 706 or other time-frequency resources are known to be absent. This permits the BS receiver to measure the desired noise power statistic (say, Nt+Ne) as shown in FIG. 7*b*.

The BS may also transmit to a specific UE (unicast), or broadcast over a specific cell or cells or over the entire network a specified measure of the ratio, measured at the UE PA output, between the energy per active sub-carrier Es, and the equivalent noise power density in inactive sub-carriers. A UE receiving such an indication, via a common or dedicated control channel, would then a) adjust their maximum power level or operating point such that the ratio Es/Ne is aligned with the specified broadcast or unicast value. Alternatively, the BS may also transmit an upper or lower bound on this ratio. Typically, the transmission on the control channel of such a measure would require quantization of the specified value or bound to an integer word of a number N of bits.

As suggested above, the TPD applied to the power amplifier is a function of OPD and WPD. In one embodiment, relaxed emissions may be signaled by the base station to a specific UE or it may be transmitted on a broadcast control signal. The signaling may directly set the appropriate emissions level, or it may provide enough information for the UE to intelligently determine an appropriate emission level. The UE may respond by adjusting the PA supply voltage and/or adjusting the PA load line, both resulting in improved device efficiency. The appropriate emission level is the level at which all regulatory and system requirements, at the time of transmission, are met. The appropriate emission level will change from location to location, with regard to regulatory requirements from time to time and with regard to the distribution of other system users. Pertinent information about other users includes modulation type, modulation bandwidth, frequency offset, and transmit duration. Any of these properties can change quickly and often, for example, every 0.5 ms.

In some joint-coding scenarios, each UE has knowledge of every other UE's parameters, for example, modulation, bandwidth, etc. In one embodiment, an algorithm uses the provided information and transmitter characteristics to adjust the transmitter so that interference is minimized. The algorithm generally uses implicit rules but may be directed by the BS to modify some of these rules and even add additional rules. This signaling permits a UE to autonomously relax waveform quality, for example, based on emissions requirements. This signaling may also allow the UE to adjust waveform quality during network access, for example, during Random Access Channel (RACH) access.

One form of joint-coding scenario, that of using NS_07 signaling, has been previously described. However, it will be obvious to those of ordinary skill in the art having the benefit of this disclosure that embodiments of the invention are not so limited. Namely, the voltage level (605) of a PA (608) can be adjusted in other ways to facilitate PA power management in response to signaling or coding. One such example is shown in FIG. 8.

Figure 8:
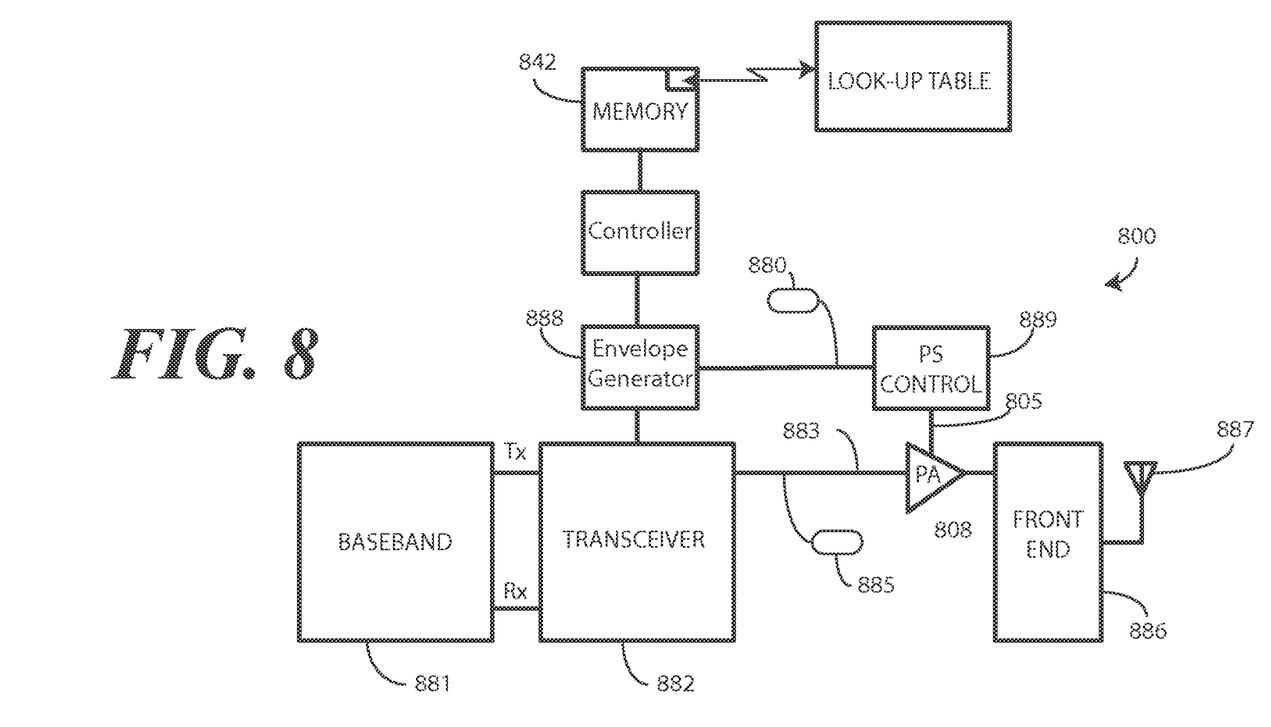
FIG. 8 illustrates another exemplary wireless communication system.

Turning now to FIG. 8, is a PA circuit 800 configured in accordance with one or more embodiments of the invention. The PA circuit 800 is configured to adjust a voltage level 805 of a PA 808 based upon NS_07 signaling. Rather than using look-up tables (609) to set DCDC values based upon NS_07 signaling, the PA circuit 800 of FIG. 8 uses an envelope-tracking schema to adjust the voltage level 805. The PA circuit 800 includes a baseband processor 881 that communicates with a transceiver 882 via transmit (Tx) and receive (Rx) lines to transmit and receive wireless data signals. During transmission, the transceiver 882 has an output 883 that is coupled to the PA 808. The PA 808 delivers amplified signals to a frontend network 886 that is operable with an antenna 887.

An envelope generator 888 and power supply control circuit 889 work in tandem to track the data signals 885 and provide a variable supply voltage to the PA 808. The envelope generator 888 can include an envelope detector operable to determine an envelope signal 880 from the data signals 885 as is known in the art. The power supply control circuit 889, which in one embodiment is a tracking power supply, is operable to control a voltage level 805 of the PA 808 with the envelope signal 880.

The transceiver 882 can include input signal conditioners, such as nonlinear phase mappers, phase adjusters, nonlinear gain mappers, and gain adjusters, which can function to essentially pre-distort or otherwise condition an input signal to provide a conditioned data signal to the PA 808. Such signal conditioners can be included to counteract any phase and gain distortions introduced within the PA 808 from variations in the supply voltage coming from the power supply control circuit 889. The inclusion of input signal conditioners, working in tandem with the envelope generator 888 and the power supply control circuit 889, work to minimizes phase and gain distortions in the amplified output signal. Moreover, it can provide for effectively linear, high efficiency power amplification in broadband applications. Such input signal conditioners are described in commonly assigned US Published Patent Application No. 2002/0094795, entitled "High Efficiency Wideband Linear Wireless Power Amplifier," which is incorporated herein by reference for all purposes.

In one embodiment, when NS_07 is signaled, the envelope generator 888 may adjust the envelope signal in accordance with shaping tables stored in a memory 842 that is operable with the envelope generator 888. The shaping tables may adjust the envelope signal to optimize linearity of the amplified signal from the PA 808. For example, the linearity of the PA 808 can be improved by using the envelope generator 888 to increase the power value peak above a power supply maximum level. Shaping tabes stored in the memory 842 can also be used to linearize the PA response by choosing an "iso-gain" profile, rather than letting gain of the PA 808 vary as amplitude modulation drives the PA 808 into and out of compression. When NS_07 is not signaled, are more aggressive shaping table stored in the memory 842 can be used. The more aggressive shaping tables may compromise linearity of the amplified signal to achieve better emissions performance and/or reduced current drain.

In some other dedicated-coding scenarios, each UE only has knowledge of its own transmit parameters. Algorithms similar to the one described above are performed at the BS and relevant results are relayed to each UE. The BS may directly indicate that waveform quality may be reduced and by what amount. The UE must determine the appropriate adjustments based on unique transmitter characteristics to match levels determined by the BS. Use of emission reducing filters and parameters of those filters may be defined by the BS and may change some of the implicit rules for the transmitter adjustments.

In one embodiment, a schedulable wireless communication entity varies its spectral emissions level based on a radio resource assignment, one example of this being transmission in band 13 as indicated by NS_07 signaling or in band 26 as indicated by NS_12-15 signaling. The spectral emissions level may also be varied based on radio resource assignments of other wireless communication entities operating within the same wireless communication network, or based on its interference impact with other entities, or based on the output power of the wireless communication entity. In other embodiments, the spectral emissions level of the wireless communication entity is varied based on distance to an adjacent carrier frequency, or based on a frequency band allocated to the wireless communication entity. The spectral emissions level may also be varied in accordance with adjacent frequency bands, or in accordance with a wireless communication technology deployed in a frequency band adjacent to a frequency band including the radio resource allocated to the wireless communication entity, according to a protocol state governing the schedulable wireless communication entity, according to the power headroom of the wireless communication entity, according to an indicated noise metric broadcast by the network, or according to a metric broadcast by network describing a bounding ratio of a mean power level of occupied sub-carriers to a mean power level of unoccupied sub-carriers. The spectral emissions level may also be varied based on combinations to the examples above.

As suggested, the spectral emissions level may be varied by de-rating the maximum transmit power of the wireless communication entity, for example, to align output power of the wireless communication entity with the spectral emissions level. The spectral emissions level may also be varied by re-rating the maximum transmit power of the wireless communication entity to align the output power of the wireless communication entity with the spectral emissions level.

A BS may monitor per-UE, or collectively, the loss of intra-cell orthogonality by assessing uplink interference with respect to the BS thermal noise level. The BS may intentionally not schedule UL transmissions (optionally using a pre-defined pattern) for such measurements. The noise measurement can be used to determine the optimal combination of sub-channel power and adjacent-sub-channel power for each user. The UE may use scheduled gaps in the downlink, or a second receiver, to identify the frequency offset of, and path loss to, an uncoordinated neighbor cell and technology (possibly augmented by location information) and then adapt waveform quality. The waveform quality may be specified via network signaling on a cell or area specific basis, based on local BS density, cell plan, re-use factor, spectrum regulations, proximity of carrier to allocation band edge, frequency-adjacent technologies, local terrain.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in a schedulable wireless communication entity that communicates in a wireless communication network, comprising:
   receiving, by the wireless communication entity, a radio resource assignment including at least one of a frequency allocation and a time allocation for one or more resource blocks, wherein the radio resource assignment further includes an NS signaling flag for one or more frequency bands, the NS signaling flag indicating whether NS signaling is active; and
   varying a spectral emissions level of the wireless communication entity for transmissions in the one or more frequency bands based on the NS signaling flag indicating whether NS signaling is active included in the radio resource assignment.

2. The method of claim 1, wherein the NS signaling flag comprises a NS_07 signaling flag.

3. The method of claim 2, further comprising varying the spectral emissions level of the wireless communication entity based on the radio resource assignment and based on an interference impact.

4. The method of claim 1, wherein the NS signaling flag comprises one of a NS_12 signaling flag, a NS_13 signaling flag, a NS_14 signaling flag, or a NS_15 signaling flag.

5. The method of claim 1, further comprising varying the spectral emissions level of the wireless communication entity based on the radio resource assignment and based upon spectral emissions level adjustment information of spectral limitations of one or more adjacent bands.

6. The method of claim 5, the spectral emissions level adjustment information comprising maximum allowable A-MPR.

7. The method of claim 1, further comprising accessing a first voltage value look-up table when the NS signaling is active.

8. The method of claim 7, the first voltage value look-up table instructing varying the spectral emissions level of the wireless communication entity to a maximum power amplifier transmission power value.

9. The method of claim 7, further comprising accessing a second voltage value look-up table that is used when the NS signaling is not active.

10. The method of claim 9, the second voltage value look-up table instructing varying the spectral emissions level of the wireless communication entity based upon a function of ACLR and power amplifier current drain.

11. The method of claim 1, further comprising varying the spectral emissions level of the wireless communication entity comprising adjusting an envelope signal in accordance with one or more shaping tables when the NS signaling is active.

12. The method of claim 1, further comprising obtaining spectral emissions level adjustment information based on radio resource assignments of other wireless communication entities in a wireless communication network from reference information stored on the wireless communication entity, varying the spectral emissions level of the wireless communication entity based on the spectral emissions level adjustment information obtained.

13. The method of claim 1, further comprising varying the spectral emissions level based on output power of the wireless communication entity.

14. The method of claim 1, further comprising varying the spectral emissions level includes de-rating a maximum transmit power of the wireless communication entity to align an output power of the wireless communication entity with the spectral emissions level.

15. The method of claim 1, further comprising varying the spectral emissions level of the wireless communication entity based on distance to an adjacent carrier frequency.

16. The method of claim 1, further comprising varying the spectral emissions level of the wireless communication entity based on a frequency band allocated to the wireless communication entity.

17. The method of claim 1, further comprising varying the spectral emissions level in accordance with adjacent frequency bands.

18. A wireless communication entity schedulable in a wireless communication network, comprising:
   a radio receiver, the radio receiver capable of receiving a radio resource assignment including at least one of a frequency allocation and a time allocation for one or more resource blocks, wherein the radio resource assignment further includes an NS signaling flag for one or more frequency bands;
   a power amplifier; and
   a controller communicably coupled to the power amplifier, the controller varying a spectral emissions level of the power amplifier for transmissions in the one or more frequency bands based on the NS signaling flag received by the radio receiver indicating whether NS signaling is active.

19. The wireless communication entity of claim 18, further comprising one or more look-up tables stored in a memory operable with the controller, wherein the controller selects a predetermined selection of the one or more look-up tables when the NS signaling flag is active.

20. The wireless communication entity of claim 18, further comprising an envelope generator, the controller being operable to adjust an envelope signal of the envelope generator in accordance with one or more shaping tables when the NS signaling flag is active.

* * * * *